United States Patent
Krishnamurthi et al.

(10) Patent No.: US 9,331,963 B2
(45) Date of Patent: May 3, 2016

(54) WIRELESS HOST I/O USING VIRTUALIZED I/O CONTROLLERS

(75) Inventors: Ashok Krishnamurthi, Saratoga, CA (US); Ariel Cohen, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 25 days.

(21) Appl. No.: 12/890,498

(22) Filed: Sep. 24, 2010

(65) Prior Publication Data

US 2012/0079143 A1   Mar. 29, 2012

(51) Int. Cl.
*G06F 3/00* (2006.01)
*H04L 12/861* (2013.01)
*G06F 3/06* (2006.01)
*G06F 9/455* (2006.01)
*H04L 12/801* (2013.01)
*H04L 29/08* (2006.01)

(52) U.S. Cl.
CPC ............. *H04L 49/90* (2013.01); *G06F 3/061* (2013.01); *G06F 3/067* (2013.01); *G06F 3/0661* (2013.01); *G06F 3/0664* (2013.01); *G06F 9/45558* (2013.01); *H04L 47/10* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 5,621,913 A * | 4/1997 | Tuttle et al. | 455/41.2 |
| 5,754,948 A * | 5/1998 | Metze | 455/41.2 |
| 5,815,675 A | 9/1998 | Steele et al. | |
| 5,898,815 A | 4/1999 | Bluhm et al. | |
| 6,003,112 A | 12/1999 | Tetrick | |
| 6,069,895 A | 5/2000 | Ayandeh | |
| 6,145,028 A | 11/2000 | Shank et al. | |
| 6,157,955 A | 12/2000 | Narad et al. | |
| 6,247,086 B1 | 6/2001 | Allingham | |
| 6,253,334 B1 | 6/2001 | Amdahl et al. | |
| 6,282,647 B1 | 8/2001 | Leung et al. | |
| 6,308,282 B1 | 10/2001 | Huang et al. | |
| 6,314,525 B1 | 11/2001 | Mahalingham et al. | |
| 6,331,983 B1 | 12/2001 | Haggerty et al. | |
| 6,343,324 B1 | 1/2002 | Hubis et al. | |
| 6,377,992 B1 * | 4/2002 | Plaza Fernandez et al. | 709/227 |
| 6,393,483 B1 | 5/2002 | Latif et al. | |
| 6,401,117 B1 | 6/2002 | Narad et al. | |
| 6,418,494 B1 | 7/2002 | Shatas et al. | |
| 6,430,191 B1 | 8/2002 | Klausmeier et al. | |
| 6,466,993 B1 | 10/2002 | Bonola | |
| 6,470,397 B1 | 10/2002 | Shah et al. | |

(Continued)

OTHER PUBLICATIONS

'Active CoordinaTion (ACT)—Toward Effectively Managing Virtualized Multicore Clouds' by Mukil Kesavan et al., copyright 2008 IEEE.*

(Continued)

*Primary Examiner* — Steven Snyder
(74) *Attorney, Agent, or Firm* — Kilpatrick Townsend & Stockton LLP

(57) ABSTRACT

Mechanisms provide hosts such as servers and mobile devices with access to virtualized I/O resources including virtual Host Bus Adapters (vHBAs) and virtual Network Interface Cards (vNICs) over a wireless I/O interconnect. Host applications access virtualized I/O resources using virtual device drivers that communicate with virtualized I/O resources on an I/O director using a reliable communication protocol running over a wireless network. I/O data is throttled if necessary based on wireless network considerations.

20 Claims, 6 Drawing Sheets

(56) References Cited

U.S. PATENT DOCUMENTS

| | | |
|---|---|---|
| 6,578,128 B1 * | 6/2003 | Arsenault et al. ............ 711/202 |
| 6,594,329 B1 | 7/2003 | Susnow |
| 6,628,608 B1 | 9/2003 | Lau et al. |
| 6,708,297 B1 | 3/2004 | Bassel |
| 6,725,388 B1 | 4/2004 | Susnow |
| 6,757,725 B1 | 6/2004 | Frantz et al. |
| 6,779,064 B2 | 8/2004 | McGowen et al. |
| 6,804,257 B1 | 10/2004 | Benayoun et al. |
| 6,807,581 B1 | 10/2004 | Starr et al. |
| 6,823,458 B1 | 11/2004 | Lee et al. |
| 6,898,670 B2 | 5/2005 | Nahum |
| 6,931,511 B1 | 8/2005 | Weybrew et al. |
| 6,937,574 B1 | 8/2005 | Delaney et al. |
| 6,963,946 B1 | 11/2005 | Dwork et al. |
| 6,970,921 B1 | 11/2005 | Wang et al. |
| 7,011,845 B2 | 3/2006 | Kozbor et al. |
| 7,046,668 B2 | 5/2006 | Pettey et al. |
| 7,093,265 B1 | 8/2006 | Jantz et al. |
| 7,096,308 B2 | 8/2006 | Main et al. |
| 7,103,064 B2 | 9/2006 | Pettey et al. |
| 7,103,888 B1 | 9/2006 | Cayton et al. |
| 7,111,084 B2 | 9/2006 | Tan et al. |
| 7,120,728 B2 | 10/2006 | Krakirian et al. |
| 7,127,445 B2 | 10/2006 | Mogi et al. |
| 7,143,227 B2 | 11/2006 | Maine |
| 7,159,046 B2 | 1/2007 | Mulla et al. |
| 7,171,434 B2 | 1/2007 | Ibrahim et al. |
| 7,171,495 B2 | 1/2007 | Matters et al. |
| 7,181,211 B1 | 2/2007 | Phan-Anh |
| 7,188,209 B2 | 3/2007 | Pettey et al. |
| 7,203,842 B2 | 4/2007 | Kean |
| 7,209,439 B2 | 4/2007 | Rawlins et al. |
| 7,213,246 B1 | 5/2007 | van Rietschote et al. |
| 7,219,183 B2 | 5/2007 | Pettey et al. |
| 7,240,098 B1 | 7/2007 | Mansee |
| 7,260,661 B2 | 8/2007 | Bury et al. |
| 7,269,168 B2 | 9/2007 | Roy et al. |
| 7,281,030 B1 | 10/2007 | Davis |
| 7,281,077 B2 | 10/2007 | Woodral |
| 7,281,169 B2 | 10/2007 | Golasky et al. |
| 7,307,948 B2 | 12/2007 | Infante et al. |
| 7,308,551 B2 | 12/2007 | Arndt et al. |
| 7,334,178 B1 | 2/2008 | Aulagnier |
| 7,345,689 B2 | 3/2008 | Janus et al. |
| 7,346,716 B2 | 3/2008 | Bogin et al. |
| 7,360,017 B2 | 4/2008 | Higaki et al. |
| 7,366,842 B1 | 4/2008 | Acocella et al. |
| 7,386,637 B2 * | 6/2008 | Arndt et al. ............ 710/9 |
| 7,395,352 B1 * | 7/2008 | Lam ............ H04L 67/1095 707/999.202 |
| 7,412,536 B2 | 8/2008 | Oliver et al. |
| 7,421,710 B2 | 9/2008 | Qi et al. |
| 7,424,529 B2 | 9/2008 | Hubis |
| 7,433,300 B1 | 10/2008 | Bennett et al. |
| 7,457,897 B1 | 11/2008 | Lee et al. |
| 7,457,906 B2 | 11/2008 | Pettey et al. |
| 7,493,416 B2 | 2/2009 | Pettey |
| 7,502,884 B1 | 3/2009 | Shah et al. |
| 7,509,436 B1 | 3/2009 | Rissmeyer |
| 7,516,252 B2 | 4/2009 | Krithivas |
| 7,602,774 B1 * | 10/2009 | Sundaresan et al. ......... 370/381 |
| 7,606,260 B2 | 10/2009 | Oguchi et al. |
| 7,609,723 B2 | 10/2009 | Munguia |
| 7,634,650 B1 | 12/2009 | Shah et al. |
| 7,669,000 B2 | 2/2010 | Sharma et al. |
| 7,711,789 B1 | 5/2010 | Jnagal et al. |
| 7,733,890 B1 | 6/2010 | Droux et al. |
| 7,782,869 B1 * | 8/2010 | Chitlur Srinivasa ..... 370/395.41 |
| 7,783,788 B1 * | 8/2010 | Quinn et al. ............ 710/8 |
| 7,792,923 B2 | 9/2010 | Kim |
| 7,793,298 B2 * | 9/2010 | Billau et al. ............ 718/104 |
| 7,821,973 B2 | 10/2010 | McGee et al. |
| 7,836,332 B2 | 11/2010 | Hara et al. |
| 7,843,907 B1 * | 11/2010 | Abou-Emara et al. ........ 370/386 |
| 7,849,153 B2 | 12/2010 | Kim |
| 7,865,626 B2 | 1/2011 | Hubis |
| 7,870,225 B2 | 1/2011 | Kim |
| 7,899,928 B1 | 3/2011 | Naik et al. |
| 7,933,993 B1 | 4/2011 | Skinner |
| 7,937,447 B1 | 5/2011 | Cohen et al. |
| 7,941,814 B1 | 5/2011 | Okcu et al. |
| 8,041,875 B1 | 10/2011 | Shah et al. |
| 8,180,872 B1 | 5/2012 | Marinelli et al. |
| 8,180,949 B1 | 5/2012 | Shah et al. |
| 8,185,664 B1 | 5/2012 | Lok et al. |
| 8,195,854 B1 | 6/2012 | Sihare |
| 8,200,871 B2 | 6/2012 | Rangan et al. |
| 8,218,538 B1 | 7/2012 | Chidambaram et al. |
| 8,228,820 B2 | 7/2012 | Gopal Gowda et al. |
| 8,261,068 B1 | 9/2012 | Raizen et al. |
| 8,285,907 B2 | 10/2012 | Chappell et al. |
| 8,291,148 B1 | 10/2012 | Shah et al. |
| 8,387,044 B2 | 2/2013 | Yamada et al. |
| 8,392,645 B2 | 3/2013 | Miyoshi |
| 8,397,092 B2 | 3/2013 | Karnowski |
| 8,443,119 B1 | 5/2013 | Limaye et al. |
| 8,458,306 B1 | 6/2013 | Sripathi |
| 8,677,023 B2 | 3/2014 | Venkataraghavan et al. |
| 8,892,706 B1 | 11/2014 | Dalal |
| 9,064,058 B2 | 6/2015 | Daniel |
| 9,083,550 B2 | 7/2015 | Cohen et al. |
| 2001/0032280 A1 | 10/2001 | Osakada et al. |
| 2001/0037406 A1 | 11/2001 | Philbrick et al. |
| 2002/0023151 A1 | 2/2002 | Iwatani |
| 2002/0065984 A1 | 5/2002 | Thompson et al. |
| 2002/0069245 A1 | 6/2002 | Kim |
| 2002/0146448 A1 | 10/2002 | Kozbor et al. |
| 2002/0152327 A1 | 10/2002 | Kagan et al. |
| 2003/0007505 A1 | 1/2003 | Noda et al. |
| 2003/0028716 A1 | 2/2003 | Sved |
| 2003/0037177 A1 | 2/2003 | Sutton et al. |
| 2003/0051076 A1 | 3/2003 | Webber |
| 2003/0081612 A1 | 5/2003 | Goetzinger et al. |
| 2003/0093501 A1 | 5/2003 | Carlson et al. |
| 2003/0099254 A1 | 5/2003 | Richter |
| 2003/0110364 A1 | 6/2003 | Tang et al. |
| 2003/0126315 A1 | 7/2003 | Tan et al. |
| 2003/0126320 A1 | 7/2003 | Liu et al. |
| 2003/0126344 A1 | 7/2003 | Hodapp, Jr. |
| 2003/0131182 A1 | 7/2003 | Kumar et al. |
| 2003/0165140 A1 | 9/2003 | Tang et al. |
| 2003/0172149 A1 | 9/2003 | Edsall et al. |
| 2003/0200315 A1 | 10/2003 | Goldenberg et al. |
| 2003/0208614 A1 | 11/2003 | Wilkes |
| 2003/0212755 A1 | 11/2003 | Shatas et al. |
| 2003/0226018 A1 | 12/2003 | Tardo et al. |
| 2003/0229645 A1 | 12/2003 | Mogi et al. |
| 2004/0003141 A1 | 1/2004 | Matters et al. |
| 2004/0003154 A1 | 1/2004 | Harris et al. |
| 2004/0008713 A1 | 1/2004 | Knight et al. |
| 2004/0025166 A1 | 2/2004 | Adlung et al. |
| 2004/0028063 A1 | 2/2004 | Roy et al. |
| 2004/0030857 A1 | 2/2004 | Krakirian et al. |
| 2004/0034718 A1 | 2/2004 | Goldenberg et al. |
| 2004/0054776 A1 | 3/2004 | Klotz et al. |
| 2004/0057441 A1 | 3/2004 | Li et al. |
| 2004/0064590 A1 | 4/2004 | Starr et al. |
| 2004/0078632 A1 | 4/2004 | Infante et al. |
| 2004/0081145 A1 | 4/2004 | Harrekilde-Petersen et al. |
| 2004/0107300 A1 | 6/2004 | Padmanabhan et al. |
| 2004/0123013 A1 | 6/2004 | Clayton et al. |
| 2004/0139237 A1 | 7/2004 | Rangan et al. |
| 2004/0151188 A1 | 8/2004 | Maveli et al. |
| 2004/0160970 A1 | 8/2004 | Dally et al. |
| 2004/0172494 A1 | 9/2004 | Pettey et al. |
| 2004/0179529 A1 | 9/2004 | Pettey et al. |
| 2004/0210623 A1 | 10/2004 | Hydrie et al. |
| 2004/0218579 A1 | 11/2004 | An |
| 2004/0225719 A1 | 11/2004 | Kisley et al. |
| 2004/0225764 A1 | 11/2004 | Pooni et al. |
| 2004/0233933 A1 | 11/2004 | Munguia |
| 2004/0236877 A1 | 11/2004 | Burton |
| 2005/0010688 A1 | 1/2005 | Murakami et al. |
| 2005/0033878 A1 | 2/2005 | Pangal et al. |

(56) References Cited

U.S. PATENT DOCUMENTS

| | | |
|---|---|---|
| 2005/0039063 A1 | 2/2005 | Hsu et al. |
| 2005/0044301 A1 | 2/2005 | Vasilevsky et al. |
| 2005/0050191 A1 | 3/2005 | Hubis |
| 2005/0058085 A1 | 3/2005 | Shapiro et al. |
| 2005/0066045 A1 | 3/2005 | Johnson et al. |
| 2005/0080923 A1 | 4/2005 | Elzur |
| 2005/0080982 A1 | 4/2005 | Vasilevsky et al. |
| 2005/0091441 A1 | 4/2005 | Qi et al. |
| 2005/0108407 A1 | 5/2005 | Johnson et al. |
| 2005/0111483 A1 | 5/2005 | Cripe et al. |
| 2005/0114569 A1 | 5/2005 | Bogin et al. |
| 2005/0114595 A1 | 5/2005 | Karr et al. |
| 2005/0120160 A1 | 6/2005 | Plouffe et al. |
| 2005/0141425 A1 | 6/2005 | Foulds |
| 2005/0160251 A1 | 7/2005 | Zur et al. |
| 2005/0182853 A1 | 8/2005 | Lewites et al. |
| 2005/0188239 A1 | 8/2005 | Golasky et al. |
| 2005/0198410 A1 | 9/2005 | Kagan et al. |
| 2005/0198523 A1 | 9/2005 | Shanbhag et al. |
| 2005/0203908 A1* | 9/2005 | Lam ................... H04L 41/0893 |
| 2005/0232285 A1 | 10/2005 | Terrell et al. |
| 2005/0238035 A1 | 10/2005 | Riley |
| 2005/0240621 A1 | 10/2005 | Robertson et al. |
| 2005/0240932 A1* | 10/2005 | Billau et al. ................... 718/104 |
| 2005/0262269 A1 | 11/2005 | Pike |
| 2006/0004983 A1* | 1/2006 | Tsao et al. ................... 711/202 |
| 2006/0007937 A1 | 1/2006 | Sharma |
| 2006/0010287 A1 | 1/2006 | Kim |
| 2006/0013240 A1 | 1/2006 | Ma et al. |
| 2006/0045098 A1 | 3/2006 | Krause |
| 2006/0050693 A1 | 3/2006 | Bury et al. |
| 2006/0059400 A1 | 3/2006 | Clark et al. |
| 2006/0092928 A1 | 5/2006 | Pike et al. |
| 2006/0129699 A1 | 6/2006 | Kagan et al. |
| 2006/0136570 A1 | 6/2006 | Pandya |
| 2006/0168286 A1 | 7/2006 | Makhervaks et al. |
| 2006/0168306 A1 | 7/2006 | Makhervaks et al. |
| 2006/0179178 A1 | 8/2006 | King |
| 2006/0182034 A1 | 8/2006 | Klinker et al. |
| 2006/0184711 A1 | 8/2006 | Pettey et al. |
| 2006/0193327 A1 | 8/2006 | Arndt et al. |
| 2006/0200584 A1 | 9/2006 | Bhat |
| 2006/0212608 A1* | 9/2006 | Arndt et al. ....................... 710/9 |
| 2006/0224843 A1 | 10/2006 | Rao et al. |
| 2006/0233168 A1 | 10/2006 | Lewites et al. |
| 2006/0242332 A1 | 10/2006 | Johnsen et al. |
| 2006/0253619 A1 | 11/2006 | Torudbakken et al. |
| 2006/0282591 A1 | 12/2006 | Krithivas |
| 2006/0292292 A1 | 12/2006 | Brightman et al. |
| 2007/0011358 A1* | 1/2007 | Wiegert ................. H04L 47/10 709/250 |
| 2007/0050520 A1 | 3/2007 | Riley |
| 2007/0067435 A1 | 3/2007 | Landis et al. |
| 2007/0101173 A1 | 5/2007 | Fung |
| 2007/0112574 A1 | 5/2007 | Greene |
| 2007/0112963 A1 | 5/2007 | Dykes et al. |
| 2007/0130295 A1 | 6/2007 | Rastogi et al. |
| 2007/0220170 A1 | 9/2007 | Abjanic et al. |
| 2007/0286233 A1 | 12/2007 | Latif et al. |
| 2008/0025217 A1 | 1/2008 | Gusat et al. |
| 2008/0082696 A1 | 4/2008 | Bestler |
| 2008/0159260 A1 | 7/2008 | Vobbilisetty et al. |
| 2008/0192648 A1 | 8/2008 | Galles |
| 2008/0205409 A1 | 8/2008 | McGee et al. |
| 2008/0225877 A1 | 9/2008 | Yoshida |
| 2008/0270726 A1 | 10/2008 | Elnozahy et al. |
| 2008/0288627 A1 | 11/2008 | Hubis |
| 2008/0301692 A1* | 12/2008 | Billau et al. ................... 718/104 |
| 2008/0307150 A1 | 12/2008 | Stewart et al. |
| 2009/0070422 A1 | 3/2009 | Kashyap et al. |
| 2009/0106470 A1 | 4/2009 | Sharma et al. |
| 2009/0307388 A1 | 12/2009 | Tchapda |
| 2010/0088432 A1 | 4/2010 | Itoh |
| 2010/0138602 A1 | 6/2010 | Kim |
| 2010/0195549 A1* | 8/2010 | Aragon et al. ................. 370/311 |
| 2010/0232450 A1 | 9/2010 | Maveli et al. |
| 2010/0293552 A1 | 11/2010 | Allen et al. |
| 2011/0153715 A1 | 6/2011 | Oshins et al. |
| 2011/0154318 A1* | 6/2011 | Oshins et al. ..................... 718/1 |
| 2012/0110385 A1 | 5/2012 | Fleming et al. |
| 2012/0144006 A1 | 6/2012 | Wakamatsu et al. |
| 2012/0158647 A1 | 6/2012 | Yadappanavar et al. |
| 2012/0163376 A1 | 6/2012 | Shukla et al. |
| 2012/0163391 A1 | 6/2012 | Shukla et al. |
| 2012/0166575 A1 | 6/2012 | Ogawa et al. |
| 2012/0167080 A1 | 6/2012 | Vilayannur et al. |
| 2012/0209905 A1 | 8/2012 | Haugh et al. |
| 2012/0239789 A1 | 9/2012 | Ando et al. |
| 2012/0304168 A1 | 11/2012 | Raj Seeniraj et al. |
| 2013/0031200 A1 | 1/2013 | Gulati et al. |
| 2013/0080610 A1 | 3/2013 | Ando |
| 2013/0117421 A1 | 5/2013 | Wimmer |
| 2013/0117485 A1 | 5/2013 | Varchavtchik et al. |
| 2013/0138758 A1 | 5/2013 | Cohen et al. |
| 2013/0138836 A1 | 5/2013 | Cohen et al. |
| 2013/0145072 A1 | 6/2013 | Venkataraghavan et al. |
| 2013/0159637 A1* | 6/2013 | Forgette et al. ............... 711/154 |
| 2013/0179532 A1 | 7/2013 | Tameshige et al. |
| 2013/0201988 A1 | 8/2013 | Zhou et al. |
| 2014/0122675 A1 | 5/2014 | Cohen et al. |
| 2015/0134854 A1 | 5/2015 | Tchapda |

OTHER PUBLICATIONS

Wikipedia's article on 'InfiniBand' from Aug. of 2010.*

'Xsigo—Try it out, I dare you!' by Nigel Poulton, Nov. 16, 2009.*

'IBMon: Monitoring VMM-Bypass Capable InfiniBand Devices using Memory Introspection' by Adit Ranadive et al., Copyright 2009 ACM.*

'Wired or Wireless? Choose Your Network' by Scott Spanbauer, Sep. 30, 2003.*

'HTTP Persistent Connection Establishment, Management and Termination' section of the 'TCP/IP Guide' version 3.0, Sep. 20, 2005 (full guide can be found at http://www.tcpipguide.com/free/index.htm).*

'TCP Segment Retransmission Timers and the Retransmission Queue' section of the 'TCP/IP Guide' version 3.0, Sep. 20, 2005 (full guide can be found at http://www.tcpipguide.com/free/index.htm).*

'TCP Window Size Adjustment and Flow Control' section of the 'TCP/IP Guide' version 3.0, Sep. 20, 2005 (full guide can be found at http://www.tcpipguide.com/free/index.htm).*

'Improving TCP/IP Performance over Wireless Networks' by Hari Balakrishnan et al., Proc. 1st ACM Int'l Conf. on Mobile Computing and Networking (Mobicom), Nov. 95.*

U.S. Appl. No. 11/083,258, Non-Final Office Action mailed on Sep. 18, 2013, 35 pages.

U.S. Appl. No. 11/145,698, Notice of Allowance mailed on Oct. 24, 2013, 15 pages.

U.S. Appl. No. 11/200,761, Final Office Action mailed on Jan. 9, 2014, 23 pages.

U.S. Appl. No. 12/544,744, Non-Final Office Action mailed on Apr. 4, 2014, 30 pages.

Marshall, Xsigo Systems Launches Company and 1/0 Virtualization Product, vmblog.com, http:/lvmblog.com/archive/2007/09/15/xsigo-systems-launches-company-and-i-o-virtualization-product.aspx, accessed on Mar. 24, 2014, Sep. 15, 2007.

U.S. Appl. No. 11/083,258, Final Office Action mailed on Apr. 18, 2014, 37 pages.

International Search Report and Written Opinion of PCT/US2013/065008 mailed on Apr. 16, 2014, 17 pages.

U.S. Appl. No. 11/083,258, Non-Final Office Action mailed on Sep. 10, 2014, 34 pages.

U.S. Appl. No. 11/200,761, Advisory Action mailed on Oct. 21, 2009, 2 pages.

U.S. Appl. No. 11/200,761, Advisory Action mailed on Apr. 19, 2013, 3 pages.

U.S. Appl. No. 11/200,761, Advisory Action mailed on Aug. 31, 2010, 3 pages.

U.S. Appl. No. 12/544,744, Final Office Action mailed on Nov. 7, 2014, 32 pages.

(56) References Cited

OTHER PUBLICATIONS

U.S. Appl. No. 11/083,258, Final Office Action mailed on Mar. 19, 2015, 37 pages.
U.S. Appl. No. 13/663,405, Notice of Allowance mailed on Mar. 12, 2015, 13 pages.
U.S. Appl. No. 11/200,761, Non-Final Office Action mailed on Mar. 11, 2015, 24 pages.
U.S. Appl. No. 13/663,405, Non-Final Office Action mailed on Nov. 21, 2014, 19 pages.
U.S. Appl. No. 12/544,744, Non-Final Office Action mailed Sep. 24, 2015, 29 pages.
U.S. Appl. No. 11/083,258, Corrected Notice of Allowability mailed on Oct. 15, 2015, 5 pages.
U.S. Appl. No. 11/083,258, Notice of Allowance mailed on Oct. 5, 2015, 8 pages.
U.S. Appl. No. 11/200,761, Final Office Action mailed on Oct. 22, 2015, 22 pages.
U.S. Appl. No. 11/083,258, Final Office Action mailed on Feb. 2, 2009, 13 pages.
U.S. Appl. No. 11/083,258, Final Office Action mailed on Jun. 10, 2010, 15 pages.
U.S. Appl. No. 11/083,258, Final Office Action mailed on Oct. 26, 2012, 30 pages.
U.S. Appl. No. 11/083,258, Non-Final Office Action mailed on Jul. 11, 2008, 12 pages.
U.S. Appl. No. 11/083,258, Non-Final Office Action mailed on Nov. 12, 2009, 13 pages.
U.S. Appl. No. 11/083,258, Non-Final Office Action mailed on Mar. 28, 2011, 14 pages.
U.S. Appl. No. 11/083,258, Non-Final Office Action mailed on Apr. 25, 2012, 30 pages.
U.S. Appl. No. 11/086,117, Final Office Action mailed on Dec. 23, 2008, 11 pages.
U.S. Appl. No. 11/086,117, Final Office Action mailed on Dec. 10, 2009, 18 pages.
U.S. Appl. No. 11/086,117, Non-Final Office Action mailed on May 6, 2009, 12 pages.
U.S. Appl. No. 11/086,117, Non-Final Office Action mailed on Jul. 22, 2008, 13 pages.
U.S. Appl. No. 11/086,117, Non-Final Office Action mailed on Jul. 22, 2010, 24 pages.
U.S. Appl. No. 11/086,117, Notice of Allowance mailed on Dec. 27, 2010, 15 pages.
U.S. Appl. No. 11/145,698, Final Office Action mailed on Aug. 18, 2009, 22 pages.
U.S. Appl. No. 11/145,698, Final Office Action mailed on Jul. 6, 2011, 26 pages.
U.S. Appl. No. 11/145,698, Non-Final Office Action mailed on May 9, 2013, 13 pages.
U.S. Appl. No. 11/145,698, Non-Final Office Action mailed on Mar. 31, 2009, 22 pages.
U.S. Appl. No. 11/145,698, Non-Final Office Action mailed on Mar. 16, 2011, 24 pages.
U.S. Appl. No. 11/179,085, Final Office Action mailed on Oct. 30, 2007, 13 pages.
U.S. Appl. No. 11/179,085, Non-Final Office Action mailed on May 31, 2007, 14 pages.
U.S. Appl. No. 11/179,085, Notice of Allowance mailed on Aug. 11, 2008, 4 pages.
U.S. Appl. No. 11/179,085, Pre Appeal Brief Request mailed on Jan. 24, 2008, 6 pages.
U.S. Appl. No. 11/179,085, Preliminary Amendment mailed on May 27, 2008, 9 pages.
U.S. Appl. No. 11/179,085, Response to Non-final Office Action filed on Aug. 10, 2007, 8 pages.
U.S. Appl. No. 11/179,085, filed Jul. 11, 2005.
U.S. Appl. No. 11/179,437, Final Office Action mailed on Jan. 8, 2009, 13 pages.
U.S. Appl. No. 11/179,437, Non-Final Office Action mailed on May 8, 2008, 11 pages.
U.S. Appl. No. 11/179,437, Notice of Allowance mailed on Jun. 1, 2009, 8 pages.
U.S. Appl. No. 11/179,437, filed Jul. 11, 2005.
U.S. Appl. No. 11/184,306, Non-Final Office Action mailed on Apr. 10, 2009, 5 pages.
U.S. Appl. No. 11/184,306, Notice of Allowance mailed on Aug. 10, 2009, 4 pages.
U.S. Appl. No. 11/200,761, Final Office Action mailed on Jul. 9, 2010, 22 pages.
U.S. Appl. No. 11/200,761, Final Office Action mailed on Aug. 13, 2009, 22 pages.
U.S. Appl. No. 11/200,761, Non-Final Office Action mailed on Jun. 11, 2013, 21 pages.
U.S. Appl. No. 11/200,761, Non-Final Office Action mailed on Aug. 31, 2012, 21 pages.
U.S. Appl. No. 11/200,761, Non-Final Office Action mailed on Jan. 20, 2010, 22 pages.
U.S. Appl. No. 11/200,761, Non-Final Office Action mailed on Mar. 12, 2009, 22 pages.
U.S. Appl. No. 11/200,761, Office Action mailed on Feb. 7, 2013, 22 pages.
U.S. Appl. No. 11/200,761, U.S. Patent Application mailed on Aug. 9, 2005, 32 pages.
U.S. Appl. No. 11/222,590, Non-Final Office Action mailed on Mar. 21, 2007, 6 pages.
U.S. Appl. No. 11/222,590, Notice of Allowance mailed on Sep. 18, 2007, 5 pages.
U.S. Appl. No. 12/250,842, Allowed Claims mailed on Jun. 10, 2011.
U.S. Appl. No. 12/250,842, Non-Final Office Action mailed on Aug. 10, 2010, 9 pages.
U.S. Appl. No. 12/250,842, Notice of Allowance mailed on Feb. 18, 2011, 5 pages.
U.S. Appl. No. 12/250,842, Notice of Allowance mailed on Jun. 10, 2011, 5 pages.
U.S. Appl. No. 12/250,842, Response to Non-Final Office Action filed on Nov. 19, 2010, 8 pages.
U.S. Appl. No. 12/250,842, filed Oct. 14, 2008.
U.S. Appl. No. 12/544,744, Final Office Action mailed on Feb. 27, 2013, 27 pages.
U.S. Appl. No. 12/544,744, Non-Final Office Action mailed on Jun. 6, 2012, 26 pages.
U.S. Appl. No. 12/862,977, Non-Final Office Action mailed on Mar. 1, 2012, 8 pages.
U.S. Appl. No. 12/862,977, Non-Final Office Action mailed on Aug. 29, 2012, 9 pages.
U.S. Appl. No. 12/862,977, Notice of Allowance mailed on Feb. 7, 2013, 11 pages.
U.S. Appl. No. 13/229,587, Non-Final Office Action mailed on Oct. 6, 2011, 4 pages.
U.S. Appl. No. 13/229,587, Notice of Allowance mailed on Jan. 19, 2012, 5 pages.
U.S. Appl. No. 13/229,587, Response to Non-Final Office Action filed on Jan. 4, 2012, 4 pages.
U.S. Appl. No. 13/445,570, Notice of Allowance mailed on Jun. 20, 2012, 5 pages.
Bhatt, Creating a Third Generation I/O Interconnect, Intel Developer Network for PCI Express Architecture, www.express-lane.org, printed Aug. 22, 2005, pp. 1-11.
Figueiredo et al., Resource Virtualization Renaissance, IEEE Computer Society, May 2005, pp. 28-31.
Liu et al., High Performance RDMA-Based MPI Implementation over InfiniBand, ICS'03, San Francisco, ACM, Jun. 23-26, 2003, 10 pages.
Wong et al., Effective Generation of Test Sequences for Structural Testing of Concurrent Programs, IEEE International Conference of Complex Computer Systems (ICECCS'05), 2005.
Xu et al., Performance Virtualization for Large-Scale Storage Systems, IEEE, 2003, 10 pages.
U.S. Appl. No. 11/083,258, Advisory Action mailed on Jan. 24, 2013, 3 pages.

* cited by examiner

WIRELESS HOST I/O USING VIRTUALIZED I/O CONTROLLERS

TECHNICAL FIELD

The present disclosure relates to providing wireless host input/output (I/O) using virtualized I/O controllers.

DESCRIPTION OF RELATED ART

A server or computing system generally includes one or more processors, memory, and input/output (I/O) resources such as network interface cards (NICs), serial ATA (SATA) adapters, and host bus adapters (HBAs). To increase processing power, servers are often aggregated as blades in a rack or as servers on a server farm or data center and interconnected using various network backbones or backplanes. In some examples, each server includes a network interface card configured for communication over an Ethernet network. The Ethernet network can include other devices that allow routing and switching to external entities and networks. Servers are often configured with multiple resources to provide fault-tolerance, sufficient capacity, or connectivity to all needed networks.

For example, a server may include multiple NICs to connect to multiple Ethernet networks. Similarly, a server may include multiple HBAs to connect to multiple Fibre Channel networks. However, providing multiple I/O resources in each server in a server rack or server farm can be expensive. A server farm including 40 individual systems that need to be connected with redundancy to three Ethernet networks and one Fibre channel network would require typically 6 NICs and 2 HBAs per system, for a total of 240 NICs and 80 HBAs which would require a total of 320 cables and 320 switch ports. Moreover, this connectivity is provided in a rigid and inflexible manner, and the process of connecting all cables correctly is error-prone.

In some instances, an I/O director can be used to virtualize I/O resources such as HBAs and NICs to provide multiple servers access to shared and fault tolerant resources. However, using an I/O director still requires significant cabling and involves complexity associated with individual system connections and cable management.

Conventional system architectures create resource usage inefficiency, server management inefficiency, security loop holes, reconfiguration inflexibility, along with a number of other drawbacks. Consequently, it is desirable to provide techniques and mechanisms for even more efficiently and effectively providing virtualized I/O to hosts such as servers and mobile devices.

BRIEF DESCRIPTION OF THE DRAWINGS

The disclosure may best be understood by reference to the following description taken in conjunction with the accompanying drawings, which illustrate particular example embodiments.

DESCRIPTION OF PARTICULAR EMBODIMENTS

Figure 1:
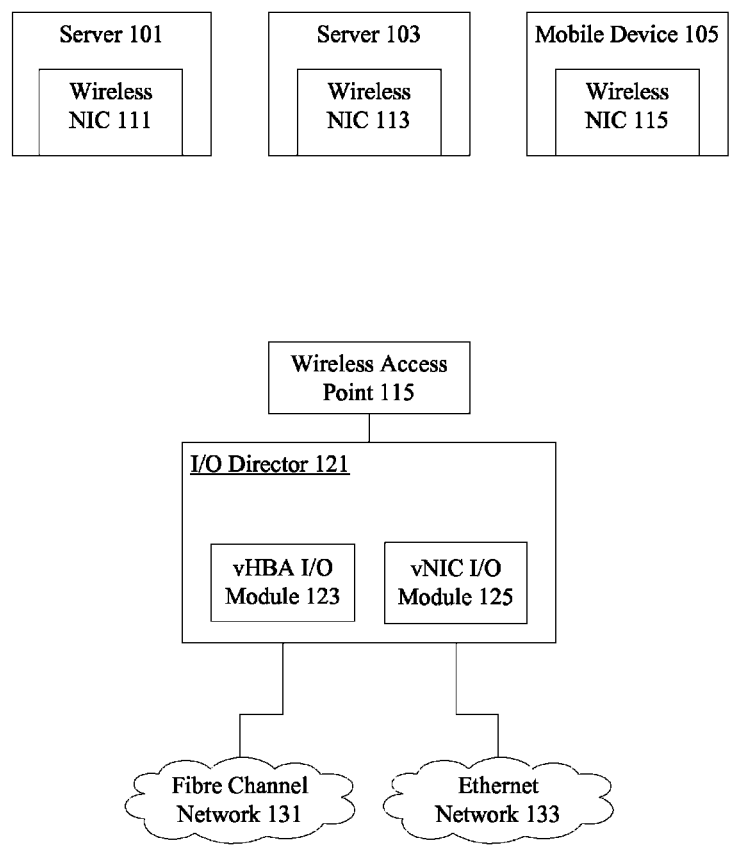
FIG. 1 illustrates one example of a system that can use the techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular wireless network protocols. However, it should be noted that the techniques and mechanisms of the present invention apply to a variety of different protocols. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms provide hosts such as servers and mobile devices with access to virtualized I/O resources including virtual Host Bus Adapters (vHBAs) and virtual Network Interface Cards (vNICs) over a wireless I/O interconnect. Host applications access virtualized I/O resources using virtual device drivers that communicate with virtualized I/O resources on an I/O director using a reliable communication protocol running over a wireless network. I/O data is throttled if necessary based on wireless network constraints.

Example Embodiments

The common approach for providing I/O connectivity to hosts such as servers, mobile devices, and other computing devices is to provide I/O controllers within the hosts. I/O controllers include Ethernet network interface cards (NICs), Fibre Channel, iSCSI and SAS host bus adapters (HBAs), etc. The I/O controllers are then connected to external devices using cables. External devices include switches, storage devices, display devices, and others. Cabling quickly becomes hard to manage in data centers with a significant number of servers, networks, and storage devices.

In some implementations, I/O controllers are offloaded onto an external shared system referred to herein as an I/O director. The I/O director provides shared and virtualized I/O resources to hosts. The I/O director includes actual I/O resources connected to external devices such as switches and storage. The hosts are connected to the I/O Director using cables, but the number of cables required to provide redundancy and fault tolerance is much lower than the number of cables required when each host has its own I/O resources. In many cases, deploying an I/O Director reduces the number of I/O cables per server from half a dozen or a dozen down to two cables. Two cables are provided for redundancy. However, eliminating even these two cables can provide significant additional benefits.

Consequently, the techniques and mechanisms of the present invention provide an approach for substantially eliminating I/O-related cables altogether from hosts. Adapters providing wireless communication are installed within the servers. These communicate with a wireless access point (WAP) which is connected to an I/O Director. The WAP may be external to the I/O Director or integrated into the I/O Director. The various I/O modules within the I/O Director (such as Ethernet vNIC, Fibre Channel vHBA) provide virtual NICs and virtual HBAs to the servers using wireless connectivity to the servers as a converged I/O channel which carries the traffic for multiple virtual I/O resources.

Hosts no longer need to be connected by cables to different networks since the I/O director provides the connectivity indirectly. There is not even a need for cabling from the hosts to the I/O director since traffic can flow wirelessly. A variety of wireless technologies including radio-based and light-based technologies can be used to connect hosts to the I/O director. Radio-based technologies include IEEE 802.11 technologies (also known as Wi-Fi) such as 802.11n, providing a data rate of up to 150 Mbit/sec, and newer technologies such as WiGig, providing a data rate of up to 7 Gbit/sec.

Although wireless connectivity is provided in network settings, the techniques and mechanisms of the present invention contemplate using wireless technologies to carry I/O traffic. A variety of differences exist between network traffic and I/O traffic. Although network traffic is sensitive to dropped data, network entities have a variety of mechanisms for handling bursty or unreliable connections. Retransmission capabilities are provided in the transport layer as well as other layers, and applications sending network traffic tolerate dropped traffic. By contrast, processors and hardware accelerator performing I/O operations such as reads and writes to disk do not tolerate dropped data. Few mechanisms are available for handling unreliability because I/O infrastructure is assumed to be very reliable. In some cases, dropped I/O data can cause application faults or system faults. Furthermore, processors and hardware accelerators often can not even handle excessively delayed I/O traffic, as responses are expected within a particular amount of time.

A reliable communication protocol that detects data loss and performs retransmissions provides a reliable communication channel over the potentially unreliable wireless link. Furthermore, the techniques and mechanisms of the present invention provide mechanisms for throttling I/O bursts when necessary due to wireless network bandwidth availability.

The reliable communication protocol can be implemented in hardware on the wireless NIC or in software running on the CPU. Reliable protocols include the Reliable Connection transport protocol of InfiniBand, the RDMA over Converged Ethernet protocol (RoCE), the Internet Wide Area RDMA Protocol (iWARP), and others. According to various embodiments, the reliable communication protocol is implemented on the hosts as well as on the I/O modules within the I/O directors.

A vHBA driver is provided on the host for communication with the storage virtual I/O modules within the I/O Director. The vHBA driver uses the reliable communication protocol as its communication channel with the I/O Director. The vHBA driver is responsible for providing block device HBA services on the host which correspond to those provided by local physical HBAs. Similarly, a vNIC driver is provided for communication with the vNIC I/O modules and for providing network device services on the server which correspond to those provided by local physical NICs. The end result is servers or mobile devices with connectivity to any number of different data and storage networks using virtual I/O devices without any I/O cables at the servers.

The techniques and mechanisms of the present invention can be applied to a variety of devices including servers and mobile devices. Rich I/O connectivity can be provided to mobile devices over their wireless connection. Without virtualized I/O resources, mobile devices have extremely limited I/O connectivity options.

FIG. 1 illustrates one example of a system that can use the techniques and mechanisms of the present invention. Hosts include servers 101, 103, and mobile device 105. The hosts are equipped with wireless NICs 111, 113, and 115 respectively. Servers 101 and 103 and mobile device 105 are connected wirelessly to the I/O director 121 through wireless access point (WAP) 115. The I/O director 121 includes vHBA I/O module 123 and vNIC I/O module 125. The vHBA I/O module 123 includes multiple vHBAs that are mapped to servers 101 and 103 and mobile device 105. Similarly, the vNIC I/O module 125 includes multiple vNICs that are mapped to servers 101 and 103 and mobile device and 105. It should be noted that the host to vHBA and vNIC correspondence need not be one-to-one. According to various embodiments, each vHBA in the vHBA I/O module 123 performs a login process with an FC switch in the FC fabric 131. In particular embodiments, each vNIC in the vNIC I/O module 125 is connected to an Ethernet switch in the Ethernet network 133.

Figure 2:
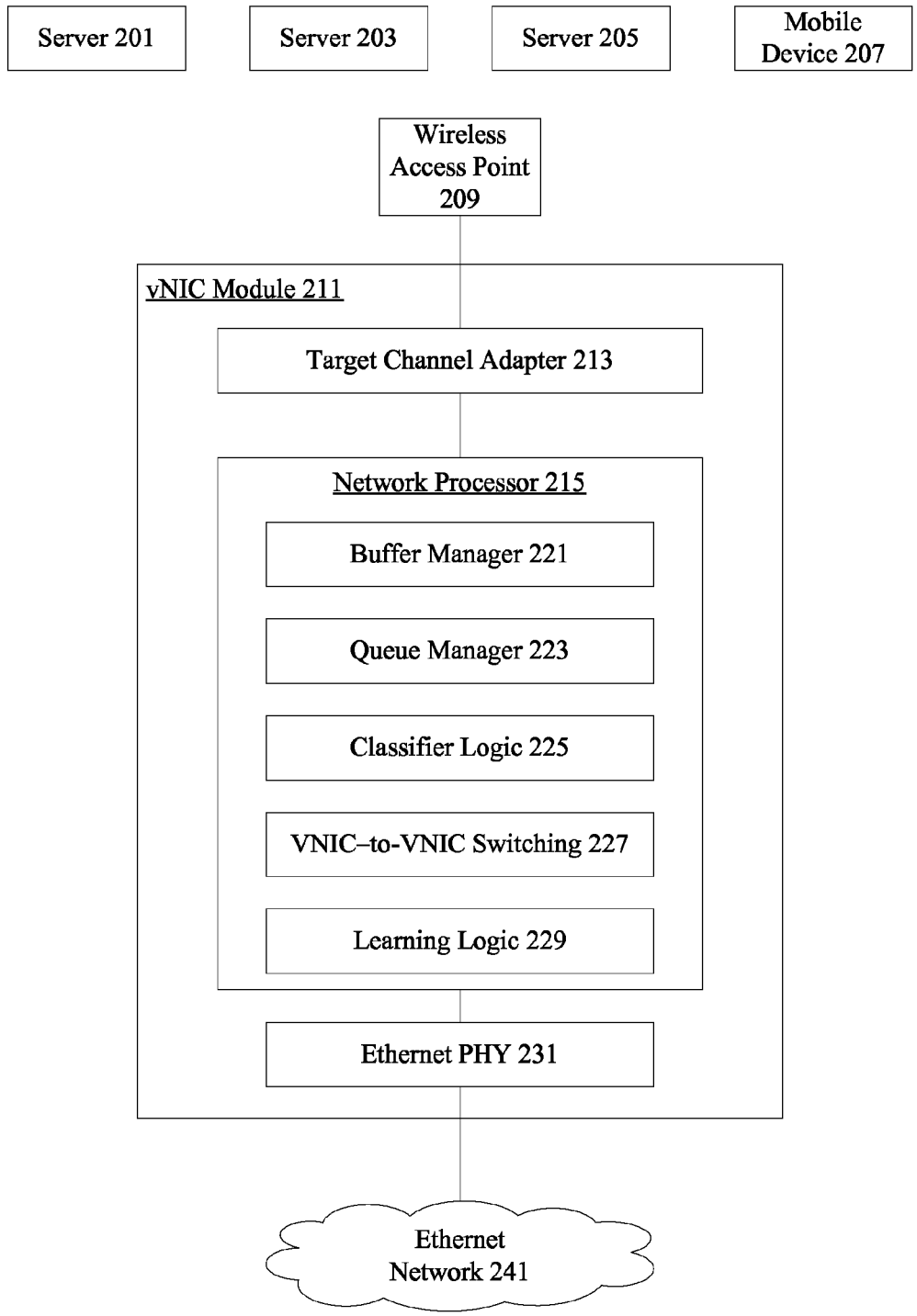
FIG. 2 is a diagrammatic representation showing an example of a Virtual Network Interface Card (vNIC) module.

FIG. 2 illustrates one example of a vNIC module in an I/O director. According to various embodiments, a vNIC module 211 is included in an I/O director that provides multiple hosts including servers 201, 203 and 205 and mobile device 207 with virtualized I/O resources including virtualized vNIC resources. The I/O director includes a target channel adapter (TCA) 213. According to various embodiments, the TCA connects a vNIC module of the I/O director with hosts 201, 203, 205, and 207 over a wireless network through wireless access point 209. A TCA can be a discrete device, or its functionality can be integrated into another device of the I/O module. A TCA may recognize and terminate various transport protocols (iWARP, RC, etc.)

According to various embodiments, the corresponding TCA removes the link and transport protocol headers from the packet when a server transmits a data packet to an I/O module. The TCA then forwards the packet with an internal header to a network processor 215.

The network processor 215 may include a buffer manager 221, a queue manager 223, classifier logic 225, vNIC-to-vNIC switching logic 227, and learning logic 229. These elements may be implemented in a network processor 215 implemented as a field-programmable gate array (FPGA) or an application-specific integrated circuit (ASIC). The network processor may also include the TCA functionality within the same device.

According to various embodiments, the classifier logic 225 includes header parsing and lookup logic configured to identify information including packet destination, priority, and TCP port data. The classifier logic 225 can be used to filter incoming data or apply traffic engineering policies. According to various embodiments, the classifier logic 225 can be used to block packets in order to implement a firewall. In particular embodiments, the buffer manager 221 manages data in memory. According to various embodiments, the queue manager 223 manages packet queues and performs traffic engineering tasks, such as traffic "policing" (i.e., enforcing committed and peak data rates available for each vNIC), shaping, and prioritization using results from classifier logic 225 and configuration information. The queue manager 223 may also perform load-balancing operations by distributing incoming traffic across multiple vNICs.

According to various embodiments, multiple vNICs terminate on the same vNIC I/O module Ethernet port. Typically, different vNICs have distinct MAC addresses that are visible on the Ethernet network. As a result, services that rely on MAC addresses, such as Dynamic Host Configuration Protocol (DHCP), are not disrupted.

The vNIC-to-vNIC switching logic 227 performs packet forwarding between vNICs terminating on the same Ethernet port. The vNIC-to-vNIC switching logic 227 maintains a table of corresponding vNICs and MAC addresses and performs packet forwarding based on MAC addresses. For example, if vNIC_1 is linked to address MAC_1, and a data packet having MAC_1 as its destination address is received on vNIC_2 which terminates on the same Ethernet port as vNIC_1, then the vNIC-to-vNIC switching logic 227 forwards this packet to vNIC_1. This functionality allows use of an I/O director with external switches that do not forward packets to the same link that they came from, so that the switching is performed in this case within I/O modules themselves.

According to various embodiments, the vNIC I/O module 203 also has learning logic 229, which is used to establish a mapping of vNICs created by virtualization software (on the servers) to vNICs of the I/O director. When a server is virtualized and one or more virtual machines are created on the server, each virtual machine can be associated with one or more vNICs, which are implemented by the server virtualization software. These vNICs are also referred to as Virtual Machine vNICs or simply VM vNICs. According to various embodiments, each VM vNIC has a MAC address, which is assigned by the virtualization software. One or more VM vNICs may be bridged to a single vNIC of the I/O director using a software virtual switch, which is implemented by the virtualization software. In particular embodiments, the traffic of multiple VM vNICs may appear on the same vNIC of the I/O director, and this traffic may include packets with different source MAC addresses for the different VM vNICs. According to various embodiments, the vNIC I/O module 203 establishes a mapping between a VM vNIC MAC addresses and a corresponding vNIC of the I/O director. This mapping enables directing incoming traffic to the correct vNIC of the I/O director. For example, if a packet with destination MAC address MAC_1 arrives at the I/O module Ethernet port, and MAC_1 is the address of VM vNIC_1, then the I/O module needs to know which vNIC of the I/O director should receive this packet. In certain embodiments, a lookup is performed in a mapping table to establish this IOD vNIC to VM vNIC correspondence.

The mapping table may be populated by the learning logic 229 as packets arrive from the servers. In certain embodiments, the learning logic examines the source MAC addresses of the packets arriving on the different vNICs of the I/O director and populates the mapping table according to the observed source MAC addresses. For example, if a packet with source MAC address MAC_1 arrives on vNIC_5 of the I/O director, then the learning logic 229 may insert an entry in the mapping table specifying that MAC_1 belongs to vNIC_5. Later, when a packet with destination address MAC_1 arrives from the network, the I/O module knows from the mapping table that the packet should be directed to vNIC_5. According to various embodiments, an Ethernet PHY 231 is configured to send and receive Ethernet frames.

In particular embodiments, data transfer between servers and their assigned vNICs is flow controlled per individual vNIC. The flow control may be provided by a transport protocol used for communication between servers and their remote I/O resources. When standard internal NICs are overwhelmed with transmitted traffic, a transmit queue becomes filled to capacity and the driver or application issuing the packets determines that no additional packets can be sent. In particular embodiments, the flow control is achieved all the way to the application generating the traffic. This approach may be more desirable than dropping packets that cannot be transmitted. The vNICs of the I/O director may be configured to provide similar functionality. Since a reliable transport protocol is used between the servers and the I/O director, the vNIC driver on the server can queue packets until they are consumed by the remote vNIC I/O module. If the queue is full, the driver may notify the sender that it has run out of transmit buffer space in the same fashion that a local NIC driver performs this task.

Figure 3:
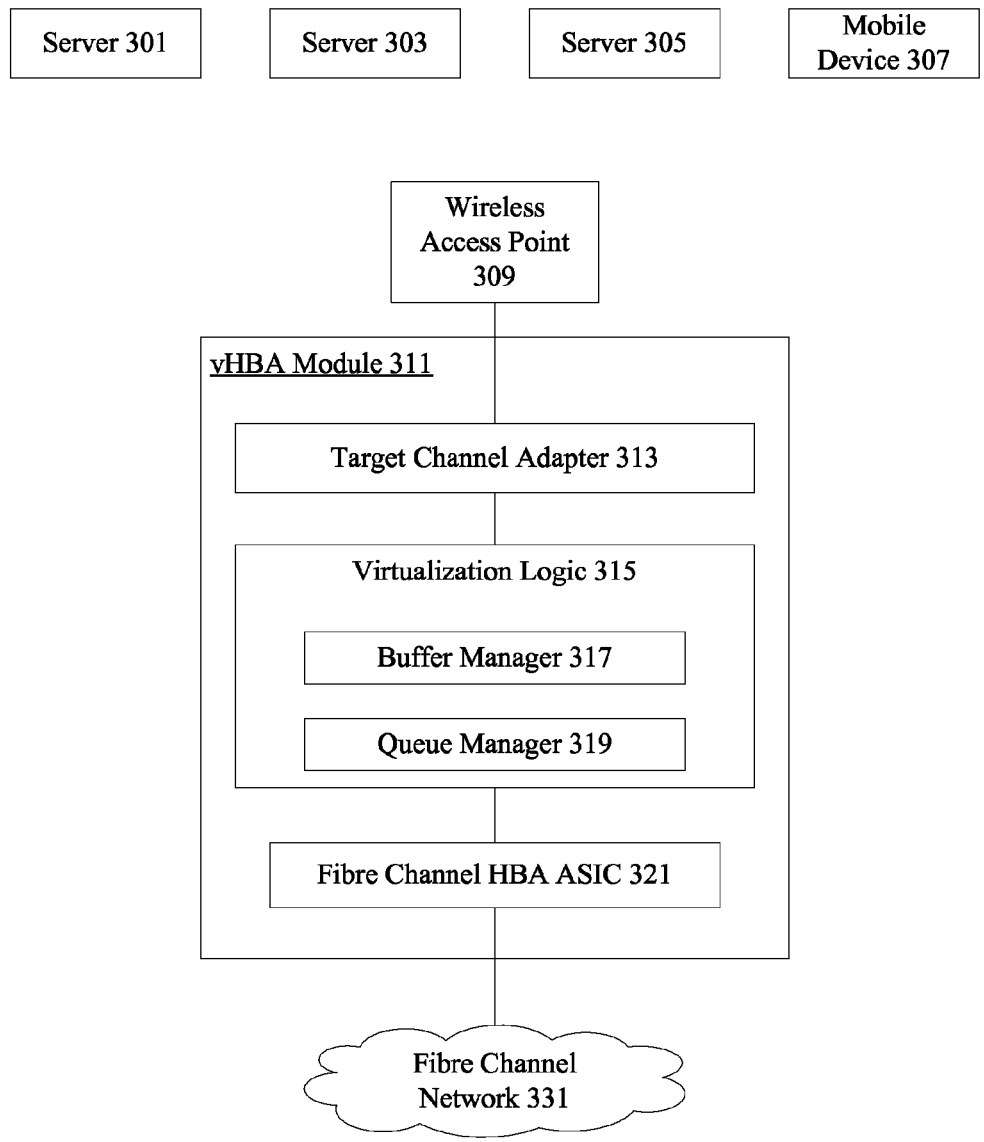
FIG. 3 is a diagrammatic representation showing an example of a Virtual Host Bus Adapter (vHBA) module.

FIG. 3 illustrates one example of a vHBA module in an I/O director. According to various embodiments, a vHBA module 311 is included in an I/O director that provides multiple hosts including servers 301, 303, and 305 and mobile device 307 with virtualized I/O resources including virtualized vHBA resources. The I/O director includes a target channel adapter (TCA) 313. According to various embodiments, the TCA connects a vHBA module of the I/O director with hosts 301, 303, 305, and 307 over a wireless network through wireless access point 309. A TCA can be a discrete device, or its functionality can be integrated into another device of the I/O module. A TCA may recognize and terminate various transport protocols (iWARP, RC, etc.)

According to various embodiments, the corresponding TCA removes the link and transport protocol headers (e.g., Ethernet link headers, iWARP/TCP/IP, RC, or other transport headers) from the packet when a server transmits a data packet to an I/O module. The TCA then forwards the packet with an internal header to virtualization logic 315.

The virtualization logic 315 may include a buffer manager 317 and a queue manager 319 and is connected to an FC HBA device 321. These elements may be implemented in a network processor or in hardware, such as FPGA or ASIC, which may also include the TCA functionality within the same device.

According to various embodiments, the server sends an I/O control block (IOCB) containing a command (e.g. a SCSI command) as well as various I/O control information, such as buffer information for data to be read or written. This IOCB propagates to the HBA according to the flow protocols described below. The two basic commands are the ones for reading data from and writing data to a target storage device.

According to various embodiments, the vHBA I/O module 311 provides N_Port ID virtualization (NPIV) functionality. NPIV allows multiple FC initiators to share a single physical port. For example, each vHBA can be viewed as a separate initiator on the port. In this case, each vHBA that terminates on the port appears with its own world-wide name (WWN) on the Fibre Channel fabric. This approach makes management of vHBAs similar to other HBAs, including management of functions like Fibre Channel zoning configuration.

In particular embodiments, the vHBA buffer manager 317 is responsible for managing buffering of data when it is transferred from the servers to the FC HBA 321, and vice versa. The queue manager 319 may be used to enforce quality-of-service properties on the data transfer. In particular examples, the queue manager 319 modulates the transfer of data to and from the servers per vHBA to comply with the committed and peak bandwidth configurations for each vHBA. According to various embodiments, data transfers are initiated by the vHBA I/O module using RDMA Read operations for reading data from server memory and RDMA Write operations for writing data to server memory It should be understood that Fibre Channel is just one example of a storage connectivity technology that can be used for the described systems and methods. Other storage connectivity technologies include Internet Small Computer System Interface (iSCSI), Serial ATA (SATA), and Serial Attached SCSI (SAS).

Figure 4:
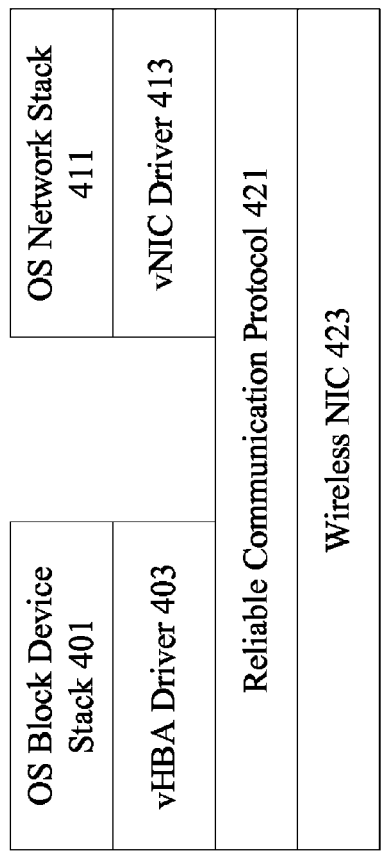
FIG. 4 illustrates one example of a virtual I/O resource communication stack on a host such as a server or mobile device.

FIG. 4 illustrates one example of a virtual I/O resource communication stack on a host such as a server or mobile device. Wireless communication technologies are often unreliable in the sense that some data is lost. Data loss can not be tolerated for I/O communication, particularly in the case of storage traffic. In order to prevent data loss, various techniques use a reliable communication protocol on top of existing wireless communication protocols that already provide some measure of reliability through error correction. The reliable communication protocol detects data loss and performs retransmissions, thereby providing a reliable communication channel over the potentially unreliable wireless link.

The reliable communication protocol can be implemented in hardware on the wireless NIC or it can be implemented in software running on the CPU. Such protocols include the Reliable Connection transport protocol of InfiniBand, the RDMA over Converged Ethernet protocol (RoCE), the Internet Wide Area RDMA Protocol (iWARP), and others. According to various embodiments, the reliable communication protocol is implemented on hosts as well as in I/O modules within the I/O directors.

According to various embodiments, the host includes an operating system block stack 401 and an operating system network stack 411. According to various embodiments, a vHBA driver 403 is provided on the server for communication with the storage virtual I/O modules within the I/O director. The vHBA driver 403 uses the reliable communication protocol 421 as its communication channel with the I/O director. The vHBA driver 403 is responsible for providing block device HBA services on the server which are identical to those provided by local physical HBAs. According to various embodiments, an HBA driver and a NIC driver are replaced with vHBA and vNIC device drivers 403 and 413 respectively.

The vHBA and vNIC device drivers 411 and 413 are configured to allow kernel access to vHBA and vNIC resources on an I/O director. The kernel continues to operate as though it has access to a peripheral such as an HBA or NIC. That is, the host kernel may continue to operate as though the HBA or NIC can be accessed directly over the bus without using an I/O director. Applications do not need to be modified to work with virtualized resources. The virtual device drivers supplied are actually providing reliable transmission of I/O data over an unreliable wireless network.

Applications may continue to use a conventional network technology such as TCP/IP and a virtual NIC driver can automatically modify data to allow transmission over a wireless network. Quality of service and traffic engineering can be applied at the I/O module level. Furthermore, resources can be flexibly provisioned and reconfigured. Multiple vNICs and vHBAs can be assigned to a single application to allow for path redundancy in the event that a single resource.

According to various embodiments, the reliable communication protocol implemented on the hosts and the I/O modules is configured to throttle I/O traffic when data rates exceed what a connected wireless network can support. In particular embodiments, reliable communication protocol driver 421, or its peers implemented on vHBA module 311 and vNIC module 211 are configured to throttle traffic based on measuring packet loss rates or packet acknowledgement delays.

A vNIC driver 413 is provided for communication with the vNIC I/O modules and for providing network device services on the server which correspond to those provided by local physical NICs. A NIC driver typically includes a packet transmit path and a packet receive path. The packet transmit path is activated whenever the upper level software passes a packet to the driver. The packet receive path is activated when the NIC receives a packet from the network, and it needs to forward the packet to the upper layers of the network stack.

In particular embodiments, a vNIC driver implements the transmit and receive paths. Packets to be transmitted may be queued in a transmit queue. The packets are sent to the remote vNIC I/O module using the reliable send operation (such as RC Send) of the transport protocol. The vNIC I/O module will then send the packet over a wireless network. Once the send is complete, the packet is de-queued from the transmit queue. Since the transport protocol is reliable, the completion of the send operation signifies that the vNIC I/O module acknowledged that the packet was received. For the vNIC receive path, the driver uses the receive operation (such as RC Receive) of the transport protocol. The receive operation is asynchronous. When the vNIC I/O module receives a packet from the wireless network, and the packets need to be sent to the host, the I/O module performs a send operation, which results in a completion of a receive operation on the server. The driver is notified of the completion, and it then processes the new packet by forwarding it to the network stack.

The result is servers or mobile devices with connectivity to any number of different data and storage networks using virtual I/O devices without requiring any I/O cables at the servers or mobile devices.

Figure 5:
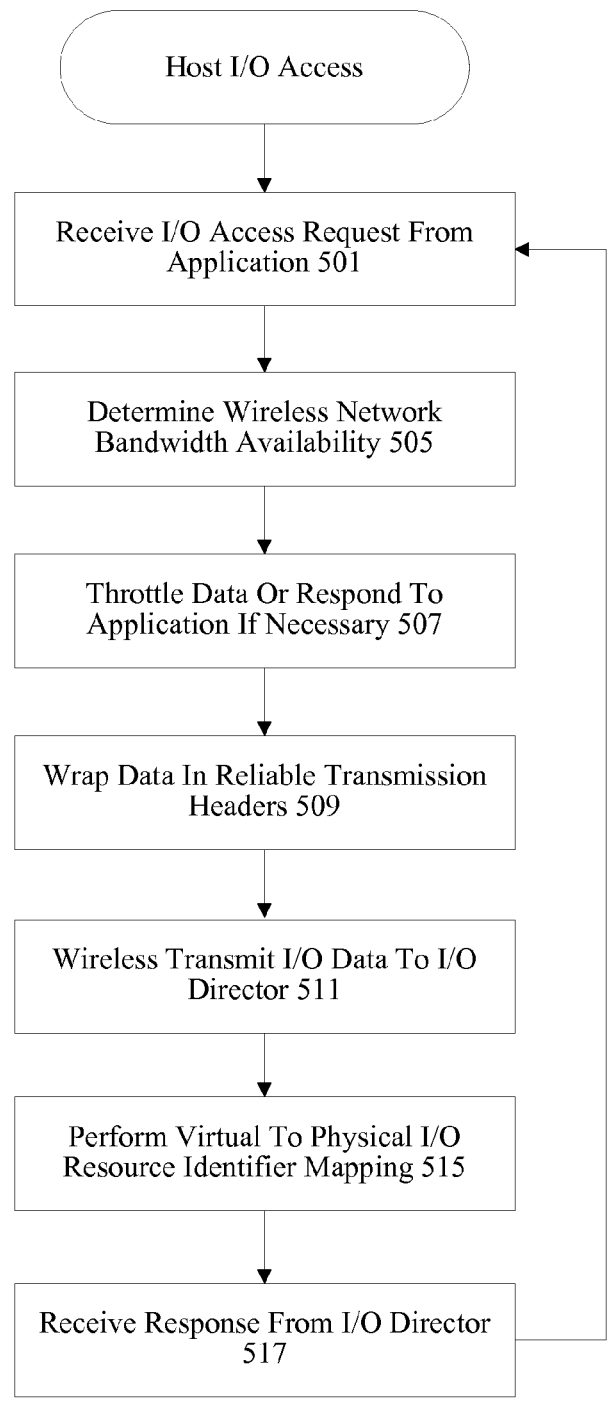
FIG. 5 illustrates one example of host operation.

FIG. 5 illustrates one example of host operation. According to various embodiments, an I/O access request is received from an application at 501. In particular embodiments, the application attempts to access an I/O resource by using a virtual device driver. According to various embodiments, the application accesses the virtual device driver as though it were accessing the actual device driver associated with a local I/O controller. No change in application behavior is required. At 505, a reliable communication protocol driver may determine wireless network bandwidth availability. In particular embodiments, the reliable communication protocol driver detects wireless network bandwidth availability and congestion levels based on packet loss rates and packet acknowledgement delays. At 507, data is throttled if necessary. In some instances, a response may be provided to an application if no bandwidth is available. At 509, data is wrapped in reliable transmission headers and wirelessly transmitted to an I/O director at 511. According to various embodiments, the I/O director performs virtual I/O resource to physical I/O resource mapping. The I/O director may then send the data to an external network or fabric. At 517, the host receives a response from the I/O director. The response is also sent using the reliable communication protocol.

Figure 6:
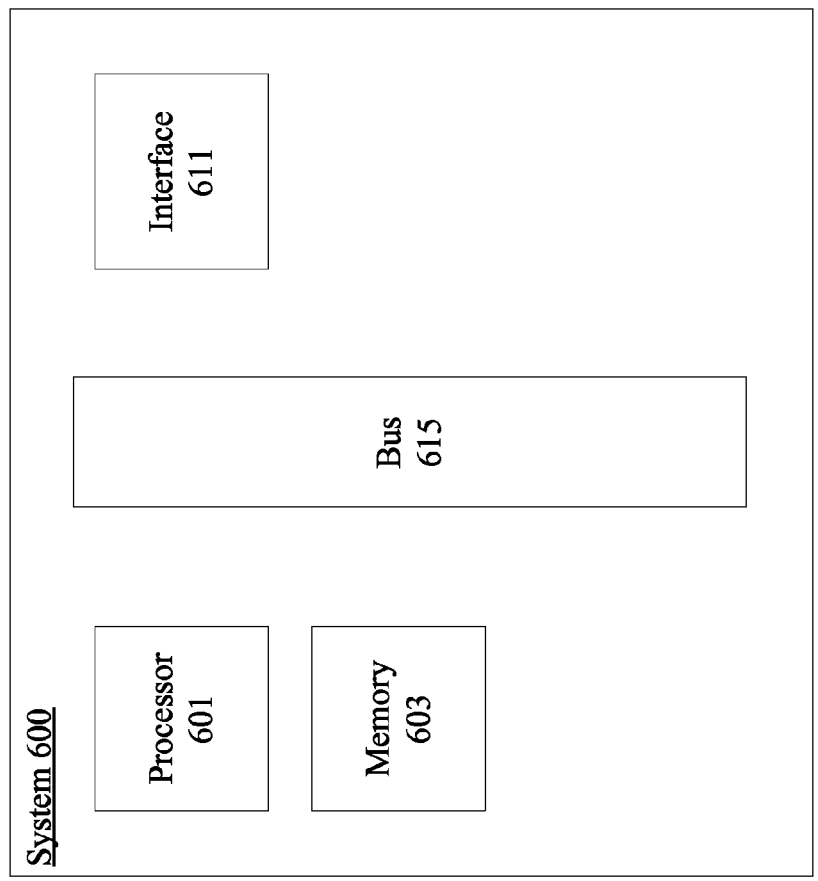
FIG. 6 provides one example of a system that can be used to implement one or more mechanisms.

According to various embodiments, the various mechanisms can be implemented in hardware, firmware, and/or software. FIG. 6 provides one example of a system that can be used to implement one or more mechanisms. For example, the system shown in FIG. 6 may be used to implement an I/O director.

According to particular example embodiments, a system 600 suitable for implementing particular embodiments of the present invention includes a processor 601, a memory 603, an interface 611, and a bus 615 (e.g., a PCI bus). When acting under the control of appropriate software or firmware, the processor 601 is responsible for such tasks such as pattern generation. Various specially configured devices can also be used in place of a processor 601 or in addition to processor 601. The complete implementation can also be done in custom hardware. The interface 611 is typically configured to send and receive data packets or data segments over a network. Particular examples of interfaces the device supports include host bus adapter (HBA) interfaces, Ethernet interfaces, frame relay interfaces, cable interfaces, DSL interfaces, token ring interfaces, and the like.

In addition, various very high-speed interfaces may be provided such as fast Ethernet interfaces, 1/10/40/100 Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications intensive tasks.

According to particular example embodiments, the system 600 uses memory 603 to store data, algorithms and program instructions. The program instructions may control the operation of an operating system and/or one or more applications, for example. The memory or memories may also be configured to store received data and process received data.

Because such information and program instructions may be employed to implement the systems/methods described herein, the present invention relates to tangible, machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
   receiving an I/O access request at a virtual device driver at a server of a plurality of servers, the I/O access request directed to at least one external storage network of a plurality of external storage networks, each server comprising at least one virtual device driver and a wireless Network Interface Controller (NIC) coupled with a wireless network;
   determining, by the server, wireless network bandwidth availability for transmissions between the server and an I/O director, the I/O director comprising a wireless access point coupled with the wireless network;
   throttling, by the wireless NIC of the server, transmissions on the wireless network between the server and the I/O director based on the determined wireless network bandwidth;
   wrapping, by the wireless NIC of the server, the I/O access request in transmission headers of a wireless communication protocol that detects data loss and retransmits detected lost data, wherein the wireless communication protocol comprises one of Reliable Connection transport protocol of InfiniBand, Remote Direct Memory Access (RDMA) over Converged Ethernet (RoCE) protocol, or Internet Wide Area RDMA Protocol (iWARP);
   transmitting the I/O access request from the wireless NIC of the server to the I/O director using the wireless communication protocol over the wireless network, wherein the I/O director performs virtual I/O to physical I/O resource mapping and transmits the I/O access request using an I/O adapter to the first external network, wherein the I/O director is connected to the plurality of external storage networks through a plurality of I/O adapters; and
   transmitting I/O data between the wireless NIC of the server and the I/O director using the wireless communication protocol over the wireless network.

2. The method of claim 1, wherein the I/O access request is a storage access request.

3. The method of claim 2, wherein the I/O access request is a write request.

4. The method of claim 2, wherein the I/O access request is a read request.

5. The method of claim 1, wherein each server of the plurality of servers comprises a virtual device driver and wherein the virtual device driver of at least one server is a virtual Host Bus Adapter (vHBA) device driver installed at the server.

6. The method of claim 5, wherein the virtual device driver of at least one server is a virtual Network Interface Card (vNIC) device driver installed at the server.

7. The method of claim 6, further comprising transmitting the I/O access request and the I/O data between the I/O director and a first external storage network of the plurality of external storage networks through a virtual Host Bus Adapter (vHBA) module of the I/O director.

8. The method of claim 7, wherein the first external storage network comprises a fibre channel network and wherein the vHBA module comprises a target channel adapter, virtualization logic, and a Fibre Channel Host Bus Adapter (HBA).

9. The method of claim 8, further comprising transmitting the I/O access request and the I/O data between the I/O director and a second external storage network of the plurality of external storage networks through a virtual Network Interface Card (vNIC) module of the I/O director.

10. The method of claim 9, wherein the second external storage network comprises an Ethernet network wherein the vNIC module comprises a target channel adapter, a network processor, and an Ethernet PHY.

11. A system comprising:
a wireless network;
a plurality of external storage networks;
a plurality of servers, each server comprising at least one virtual device driver and a wireless Network Interface Controller (NIC) coupled with the wireless network; and
an I/O director comprising a wireless access point coupled with the wireless network, wherein the I/O director is connected to the plurality of external storage networks through a plurality of I/O adapters, wherein:
the virtual device driver of a server of a plurality of servers receives an I/O access request, the I/O access request directed to at least one external storage network of the plurality of external storage networks,
the server determines wireless network bandwidth availability for transmissions between the server and an I/O director,
the wireless NIC of the server throttles transmissions on the wireless network between the server and the I/O director based on the determined wireless network bandwidth;
the wireless NIC of the server wraps the I/O access request in transmission headers of a wireless communication protocol that detects data loss, retransmits detected lost data, wherein the wireless communication protocol comprises one of Reliable Connection transport protocol of InfiniBand, Remote Direct Memory Access (RDMA) over Converged Ethernet (RoCE) protocol, or Internet Wide Area RDMA Protocol (iWARP),
the I/O access request is transmitted from the wireless NIC of the server to the I/O director using the wireless communication protocol over the wireless network,
the I/O director performs virtual I/O to physical I/O resource mapping and transmits the I/O access request using an I/O adapter to the first external network, and
I/O data is transmitted between the wireless NIC of the server and the I/O director using the wireless communication protocol over the wireless network.

12. The system of claim 11, wherein the I/O access request is a storage access request.

13. The system of claim 12, wherein the I/O access request is a write request.

14. The system of claim 12, wherein the I/O access request is a read request.

15. The system of claim 11, wherein each server of the plurality of servers comprises a virtual device driver and wherein the virtual device driver of at least one server is a virtual Host Bus Adapter (vHBA) device driver installed at the server.

16. The system of claim 15, wherein the virtual device driver of at least one server is a virtual Network Interface Card (vNIC) device driver installed at the server.

17. The system of claim 16, further comprising transmitting the I/O access request and the I/O data between the I/O director and a first external storage network of the plurality of external storage networks through a virtual Host Bus Adapter (vHBA) module of the I/O director.

18. The system of claim 17, wherein the first external storage network comprises a fibre channel network and wherein the vHBA module comprises a target channel adapter, virtualization logic, and a Fibre Channel Host Bus Adapter (HBA).

19. The system of claim 18, further comprising transmitting the I/O access request and the I/O data between the I/O director and a second external storage network of the plurality of external storage networks through a virtual Network Interface Card (vNIC) module of the I/O director.

20. The system of claim 19, wherein the second external storage network comprises an Ethernet network wherein the vNIC module comprises a target channel adapter, a network processor, and an Ethernet PHY.

* * * * *